Figures 1, 2:
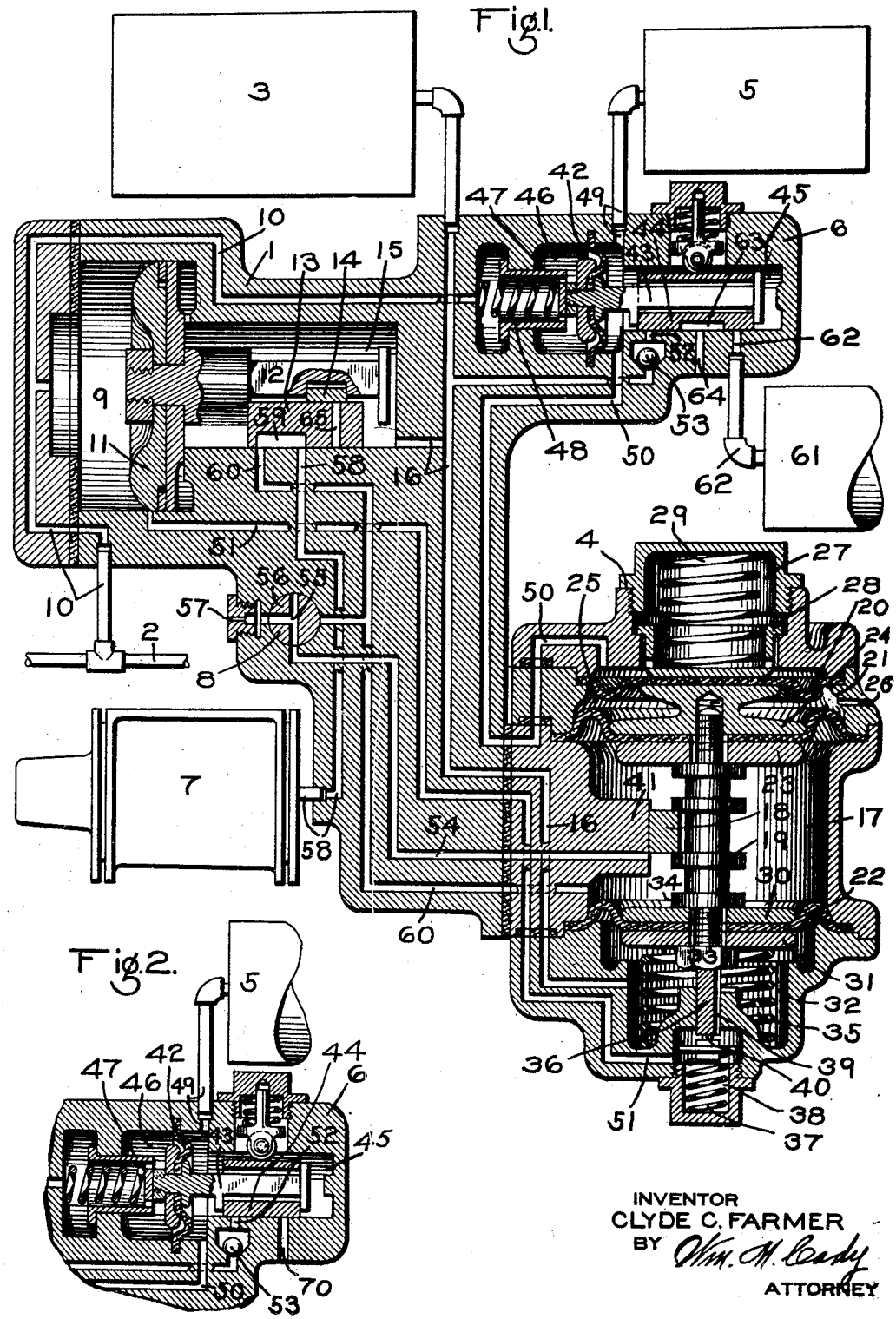

July 28, 1931. C. C. FARMER 1,816,079
FLUID PRESSURE BRAKE
Filed Dec. 31, 1929

INVENTOR
CLYDE C. FARMER
BY *Wm. M. Cady*
ATTORNEY

Patented July 28, 1931

1,816,079

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed December 31, 1929. Serial No. 417,661.

This invention relates to fluid pressure brakes and more particularly to that type of fluid pressure brake shown and described in my pending application for United States Letters Patent for improvements in fluid pressure brakes, filed March 9, 1929, and serially numbered 345,659.

With the equipment disclosed in the above referred to pending application, the control reservoir and auxiliary reservoir are connected together when an over-reduction in brake pipe pressure is effected; i. e., a reduction below the equalized pressure of the auxiliary reservoir and the brake cylinder, which results in the brake cylinder pressure being augmented by the pressure of fluid supplied from the control reservoir. On some railroads it is considered objectionable to, at any time, increase the brake cylinder pressure above that which is required to effect a normal full service application of the brakes.

The principal object of my present invention is to provide a fluid pressure brake equipment of the above type with means operative upon effecting an over reduction in brake pipe pressure for venting fluid under pressure from the control reservoir to a reduction reservoir or chamber, or to the atmosphere and thereby prevent the brake cylinder pressure from being increased above that normally required to effect a full service application of the brakes.

Other objects and advantages will appear in the following more detailed description of my invention.

In the accompanying drawings; Figure 1 is a diagrammatic view, mainly in section, of a fluid pressure brake embodying one form of my invention; Fig. 2 is a fragmentary view showing a modification of my invention.

As shown in Fig. 1 of the accompanying drawings, the brake equipment, embodying my invention, may comprise a triple valve device 1, a brake pipe 2, an auxiliary reservoir 3, a control valve device 4, a control reservoir 5, a control reservoir charging and discharging valve device 6, a brake cylinder 7, and a release change over valve device 8.

The triple valve device 1 may comprise a casing having a piston chamber 9 which is connected to the brake pipe 2 through a pipe and passage 10, and contains a piston 11 having a stem 12 adapted to operate a main slide valve 13 and an auxiliary slide valve 14 contained in a chamber 15, which chamber is connected to the auxiliary reservoir 3 through a passage 16.

The control valve device 4 may comprise a casing having a valve chamber 17 containing a slide valve 18 which is operatively connected to a stem 19. The valve 18 and stem 19 are adapted to be operated by spaced flexible diaphragms 20, 21 and 22 secured in the casing.

A flexible diaphragm 21 is clamped between a follower plate 23, contained in the chamber 17, and a follower member 24, contained in a chamber 25, which chamber 25 is constantly connected to the atmosphere through a passage 26. The member 24 has screw-threaded connection with the stem 19 and the upper end of said member engages the under side of the diaphragm 20.

Contained in a chamber 27 at one side of the diaphragm 20 is a movable stop 28, subject on one side of the pressure of a spring 29.

The flexible diaphragm 22 is clamped between a follower plate 30, contained in the chamber 17, and a follower plate 31, contained in a chamber 32, through the medium of a nut 33 having screw-threaded connection with the lower end of the stem 19, which end passes through the follower plate and the diaphragm, the upper side of the plate 30 abutting against a shoulder 34 formed on the stem 19. Contained in the chamber 32 and interposed between the plate 31 and the casing is a coil spring 35, the upper end of the spring seating against the under side of the plate.

Within the chamber 32, the lower end of the stem 19 engages the upper end of a fluid pressure supply control member 36 which is slidably mounted in the casing, and which is subject to the pressure of a coil spring 37 contained in a chamber 38, and interposed between the lower end of the member and the casing.

The member 36 is provided with a longitudinal groove 39, the lower end of which opens into a circular groove 40 formed in the member adjacent its lower end, said grooves establishing communication from the chamber 38 to the chamber 32.

Integral with the casing, and contained in the chamber 17, is a lug 41, which, at its end, is provided with a seat for the slide valve 18.

The combined charging and discharging valve device 6 may comprise a casing in which there is secured a flexible diaphragm 42, having secured thereto a stem 43 adapted to operate a slide valve 44 contained in a chamber 45 at one side of the diaphragm.

Contained in a chamber 46 at the other side of the diaphragm 42, is a stop 47 which is subject to the pressure of a coil spring 48 and which is adapted to be engaged by one end of a stem 43.

The control reservoir 5 is constantly connected to the valve chamber 45 in the valve device 6 through a pipe and passage 49, and also to the diaphragm chamber 27 in the control valve device 4 through valve chamber 45 and a passage 50.

It will be understood that the triple valve device 1 and the control valve device 2 hereinbefore described in detail, are identical in construction with the corresponding devices of the equipment shown and described in detail in my aforementioned pending application, and these devices function to control the brakes in identically the same manner as described in this pending application, and since the details of the valve device 6 and its operation to charge and discharge fluid under pressure to and from the control reservoir is all that materially differs from the corresponding charging valve of the pending application, the following description will be limited to the operation of the triple valve device 1 and control valve device 4 insofar as they cooperate with the valve device 6.

In initially charging the equipment, fluid under pressure supplied to the brake pipe 2 flows to the piston chamber 9 in the triple valve device 1 through the pipe and passage 10, causing the piston 11 to be moved to its innermost or release position, as shown in Fig. 1 of the drawing, carrying with it the slide valves 13 and 14. With the piston in this position, fluid supplied to the piston chamber 9 flows to the valve chamber 15 in the triple valve device and auxiliary reservoir 3 through a passage 51, chamber 38 in the control valve device, grooves 40 and 39 in the member 36, diaphragm chamber 32 and passage 16.

Fluid under pressure from the brake pipe 2 is also supplied to the diphragm chamber 46 in the charging valve device 6 through the pipe and passage 10, and the pressure of fluid thus supplied to this chamber, and acting on one side of the diaphragm 42, causes said diaphragm to deflect and shift the stem 43 and slide valve 44 toward the right hand to their charging position, in which the slide valve uncovers a port 52, so that fluid under pressure, supplied to the passage 16, will also flow to the control reservoir 5 past a ball check valve 53, through port 52, valve chamber 45 in the charging valve device 6 and passage and pipe 49. From the valve chamber 45, fluid under pressure also flows to the diaphragm chamber 27 in the control valve device 4 through the passage 50.

The flexible diaphragms 20 and 22 are of equal area, and since the pressure of fluid supplied to the diaphragm chambers 27 and 32 are substantially equal, the pressure of the spring 35 will maintain the diaphragm 20 in engagement with the stop 28. When the diaphragm engages the stop 28, a passage 54 through the lug 41 is uncovered by the slide valve 18, thus maintaining communication open from the valve chamber 17 to the atmosphere through passage 54, a port 55 in the valve plug 56 of the release change-over valve device 8 and restricted atmospheric passage 57, when said plug valve is in graduated release position as shown in Fig. 1.

With the triple valve device in release position, the brake cylinder 7 is connected to the valve chamber 17 of the control valve device through a pipe and passage 58, a cavity 59 in the triple valve slide valve 13, and a passage 60 thus venting the brake cylinder to the atmosphere.

With the valve device 6 in its charging position, a reduction chamber or reservoir 61 is connected to the atmosphere through a pipe and passage 62, a cavity 63 in the slide valve 44 and a passage 64.

With the equipment thus fully charged and the brake cylinder 7 connected with the atmosphere, a service application of the brakes is effected by making a gradual brake pipe reduction in the usual manner, which results in a corresponding reduction in the pressure of fluid in the piston chamber 9 of the triple valve device 1. When the pressure of fluid in the piston chamber 9 is reduced, the pressure of fluid in the slide valve chamber 15 causes the triple valve piston 11 to operate to shift the auxiliary slide valve 14 and main slide valve 13 to their application position.

When the triple valve slide valves have thus been operated to their application positions, fluid under pressure supplied to the triple valve chamber 15 from the auxiliary reservoir 3, flows to the brake cylinder 7 through a port 65 in the main slide valve and a passage 58.

The triple valve piston 11 being in service position, passage 51 is connected to the valve chamber 17 so that the pressure of fluid in the chamber 32, in the control valve device, reduces with the auxiliary reservoir pressure in chamber 17, and due to this reduction, the control reservoir pressure, present in chamber 27 and acting on the diaphragm 20, causes the slide valve 18 to be shifted downwardly against the reduced auxiliary reservoir pressure in chamber 32 and the pressure of the spring 35, lapping the passage 54 and thereby closing communication from the chamber 17 to the atmosphere.

The spring 48 of the valve device 6 may be of such a value that when the brake pipe is completely vented and the control reservoir has been reduced to, say 55 pounds, the pressure of the spring will operate the diaphragm 42 to shift the slide valve 44 to blank the exhaust passage 62, thus preventing the control reservoir pressure from being reduced below the equalization pressure of the auxiliary reservoir and brake cylinder. It will thus be seen that when a service reduction in brake pipe pressure is effected, the valve device 6 will not operate to cause a reduction in control reservoir pressure.

To release the brakes after a service application, the pressure of fluid in the brake pipe 2 is increased in the usual manner, causing the triple valve piston 11 to operate to release position, in which the passage 51 is again connected to the piston chamber 9, so that fluid at brake pipe pressure is again supplied from piston chamber 9 to the diaphragm chamber 32 in the control valve device and to the auxiliary reservoir 3. Now when the pressure of fluid thus supplied to the diaphragm chamber 32 is again substantially equal to the control reservoir pressure in the diaphragm chamber 27, the pressure of the spring 35 causes the diaphragm to shift the stem 19 and slide valve 18 upwardly until the diaphragm 20 engages the inner surface of the stop 28, at which time the operation of the control valve device will cease and the slide valve 18 will uncover the passage 51.

The operation of the triple valve piston 11 to release position, shifts the triple valve slide valves 13 and 14 to their release position, in which fluid under pressure from the brake cylinder is vented to the atmosphere through pipe and passage 58, cavity 59 in the triple valve slide valve 13, passage 60, control valve chamber 17, past the end of the control slide valve 18, through passage 54, port 55 in the change-over valve device 8 and passage 57.

In order to control a train on a grade, it is the practice to alternately apply and partially release the brake a number of times in a manner commonly termed cycling. To practice cycling by the use of my improved equipment, the engineer, preparatory to the train descending a grade, causes the equipment to be overcharged, say for instance 5 or more pounds in excess of the normal pressure, and when the pressure of fluid in chamber 32 becomes substantially equal to the pressure of fluid in chamber 27, the pressure of the spring 35 will cause the control valve device to be operated upwardly until the diaphragm 20 comes to rest against the stop 28 as shown in the drawing.

The first application of the brakes, with the train on the descending grade, will be effected in substantially the same manner as has hereinbefore been described in connection with a service application of the brakes.

The brake pipe is now recharged to the normal pressure, causing the triple valve device to operate to release position, in which fluid under pressure in the brake cylinder 7 will flow to the atmosphere in the same manner as before described. When the pressure of fluid in the chamber 17 is reduced sufficiently that the upward pressure on the under side of the large diaphragm 21, as well as the upward pressure of fluid in chamber 32 on the diaphragm 22 is less than the downward pressure of fluid in the chamber 27 on the upper side of the diaphragm 20 and the downward pressure fluid on the diaphragm 22, the control valve device will be caused to operate downwardly, shifting the slide valve 18 to a position in which it laps the passage 54, thus closing communication from the chamber 17 to the atmosphere and retaining a predetermined pressure in the brake cylinder which is proportionate to the overcharge of the equipment, which overcharge is governed by the engineer according to the condition of the grade. Now upon effecting a re-application of the brakes, the brake cylinder pressure obtained will exceed that retained in the brake cylinders from the previous application, by an amount proportional to the brake pipe reduction, thereby insuring the proper control of the train.

If, when the foot of the grade is reached, the equipment is again recharged with fluid at a pressure equal to the original overcharge, the control valve device 4 will again operate to release position as shown in the drawings, thus exhausting all brake cylinder pressure to the atmosphere. It will thus be seen that the control valve device will perform the functions of a retainer valve device and that the engineer may readily and accurately control its operation in accordance with the conditions of grade.

By maintaining the equipment overcharged, the control valve device is rendered ineffective as a brake cylinder pressure retainer and the train may proceed with the equipment thus overcharged.

If, at the foot of the grade, the engineer desires to render the control valve device ineffective as a brake cylinder pressure retainer, and also desires to reduce the pressure of fluid in the equipment to that normally carried, he operates the usual brake valve device to application position to effect an application of the brakes. Now, when the brake pipe pressure is reduced to a predetermined value, say for instance to 15 pounds, the control reservoir pressure present in the valve chamber 45 in the valve device 6, causes the diaphragm 42 to deflect toward the left hand against the pressure of the spring pressed stop 47 and the pressure of fluid in the brake pipe, operating the slide valve 44 to a position in which the passage 62 is uncovered, so that fluid under pressure from the control reservoir 5 will reduce into the reduction chamber 61.

The engineer now resets the feed valve device to supply fluid under pressure to the brake pipe at the normal pressure, so that when the engineer operates the brake valve device to release position, the equipment will be recharged with fluid under pressure at the normal pressure. When, in thus recharging the equipment, the brake pipe pressure present in the chamber 46 in the valve device 6 and acting on the diaphragm 42, becomes greater than the opposing pressure of fluid in the valve chamber 45, the diaphragm 42 will flex toward the right hand, shifting the slide valve 44 to a position in which fluid under pressure from the reduction reservoir is vented to the atmosphere by way of pipe and passage 62, cavity 63 in the slide valve 44 and passage 64.

From the foregoing description, it will be seen that I have provided means whereby the control reservoir pressure may be reduced without in any way affecting the brake cylinder pressure.

The volume of the reduction reservoir may be such that, when the reduction reservoir and an overcharged control reservoir are connected together, the equalized pressures thereof may be substantially the same as the normal control reservoir pressure or may be of such volume that the equalization pressure may be substantially equal to the normal pressure of the spring 48, so that if the spring 48 should become weak or broken the reduction of control reservoir pressure will be limited.

In Fig. 2 of the drawings, a modification of the invention has been illustrated in which the valve device 6 is operative to discharge fluid under pressure from the control reservoir to the atmosphere through a passage 70 instead of to a reduction reservoir or chamber as is the case in the form shown in Fig. 1.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe and a brake cylinder, of a normally charged reservoir, valve means subject to the pressure of fluid from said reservoir for controlling the pressure of fluid in the brake cylinder, and means operated upon a reduction in brake pipe pressure a predetermined amount below normal for reducing the pressure of fluid in said reservoir without increasing the pressure of fluid in the brake cylinder.

2. In a fluid pressure brake, the combination with a brake pipe, an auxiliary reservoir and a brake cylinder, of a normally charged control reservoir, valve means subject to the opposing pressures of fluid from said control reservoir and from said auxiliary reservoir for controlling the pressure of fluid in the brake cylinder, and means operated upon a reduction in brake pipe pressure a predetermined amount below normal for reducing the pressure of fluid in said reservoir without increasing the pressure of fluid in said auxiliary reservoir.

3. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber.

4. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure for venting fluid under pressure from said chamber.

5. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure for recharging said reservoir and for venting fluid under pressure from said chamber.

6. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure above the reduced pressure of fluid in said reservoir for venting fluid under pressure from said chamber.

7. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure above the reduced pressure of fluid in said reservoir for recharging said reservoir and for venting fluid under pressure from said chamber.

8. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure for venting fluid under pressure from said chamber to the atmosphere.

9. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber and operated upon an increase in brake pipe pressure for recharging said reservoir and for venting fluid under pressure from said chamber to the atmosphere.

10. In a fluid pressure brake, the combination with a brake pipe and a brake cylinder, of a normally charged reservoir, valve means subject to the pressure of fluid from said reservoir for controlling the pressure of fluid in the brake cylinder, and means operated upon a reduction in brake pipe pressure a predetermined amount below normal for reducing the pressure of fluid in said reservoir, said means being operative to prevent the pressure of fluid in said reservoir from being reduced below a predetermined pressure.

11. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, and means operated upon a reduction in brake pipe pressure a predetermined amount below normal for venting fluid under pressure from said reservoir to said reduction chamber, said means being operative to limit the amount of fluid under pressure vented from said reservoir.

12. In a fluid pressure brake, the combination with a brake pipe and a brake cylinder, of a normally charged reservoir, valve means subject to the pressure of fluid from said reservoir for controlling the pressure of fluid in the brake cylinder, a reduction chamber, means operated upon a reduction in brake pipe pressure a predetermined amount below normal for venting fluid under pressure from said reservoir to said chamber, and a spring cooperating with said means for limiting the amount of fluid under pressure vented from said reservoir.

13. In a fluid pressure brake, the combination with a brake pipe, an auxiliary reservoir and a brake cylinder, of a normally charged reservoir, valve means subject to the opposing pressures of the auxiliary reservoir and said normally charged reservoir for controlling the pressure of fluid in the brake cylinder, a reduction chamber, and means operated upon an overreduction in brake pipe pressure for venting fluid under pressure from said normally charged reservoir to said chamber.

14. In a fluid pressure brake, the combination with a brake pipe and a brake cylinder, of a reservoir normally charged with fluid at the normal brake pipe pressure, means operative upon an increase in brake pipe pressure above normal for overcharging said reservoir above normal, valve mechanism subject to the pressure of fluid from the overcharged reservoir for controlling the release of fluid under pressure from the brake cylinder, and a reduction chamber, said means being operative upon effecting a reduction in brake pipe pressure a predetermined amount below normal for venting fluid under pressure from said reservoir to said chamber.

15. In a fluid pressure brake, the combination with a brake pipe and a brake cylinder, of a reservoir normally charged with fluid at the normal brake pipe pressure, means operative upon an increase in brake pipe pressure above normal for overcharging said reservoir above normal, valve mechanism subject to the pressure of fluid from the overcharged reservoir for controlling the release of fluid under pressure from the brake cylinder, and a reduction chamber, said means being operative upon effecting a reduction in brake pipe pressure a predetermined amount below normal for venting fluid under pressure from said reservoir to said chamber and operative upon an increase in brake pipe pressure for recharging said reservoir.

16. In a fluid pressure brake, the combination with a brake pipe and a brake cylinder, of a reservoir normally charged with fluid at the normal brake pipe pressure, means operative upon an increase in brake pipe pressure above normal for overcharging said reservoir above normal, valve mechanism subject to the pressure of fluid from the overcharged reservoir for controlling the release of fluid under pressure from the brake cylinder, and a reduction chamber, said means being operative upon effecting a reduction in brake pipe pressure a predetermined amount below normal for venting fluid under pressure from said reservoir to said chamber and operative upon an increase in brake pipe pressure for recharging said reservoir and for venting fluid from said chamber.

17. In a fluid pressure brake, the combination with a brake pipe and a brake cylinder, of an auxiliary reservoir and a control reservoir normally charged with fluid under pressure through a passage common to both reservoirs, a valve mechanism subject to the opposing pressures of both of said reservoirs for controlling the pressure of fluid in the brake cylinder, and means operated upon an over reduction in brake pipe pressure for venting fluid under pressure from said control reservoir independently of said passage and auxiliary reservoir.

18. In a fluid pressure brake, the combination with a brake pipe, a brake cylinder, an auxiliary reservoir and a control reservoir, of a triple valve device subject to brake pipe pressure for establishing communication through which fluid under pressure is supplied to both of said reservoirs and for establishing another communication through which fluid under pressure is adapted to be released from the brake cylinder, a valve device subject to the opposing pressures of said reservoirs for controlling the release of fluid under pressure from the brake cylinder, said triple valve device being operative upon a reduction in brake pipe pressure for closing both of said communications and for establishing a communication through which fluid under pressure is supplied from the auxiliary reservoir to said brake cylinder, and means operated upon an over reduction in brake pipe pressure for venting fluid under pressure from said control reservoir independently of the auxiliary reservoir and brake cylinder.

19. In a fluid pressure brake, the combination with a brake pipe, a brake cylinder, an auxiliary reservoir and a control reservoir, of a triple valve device subject to brake pipe pressure for establishing communication through which fluid under pressure is supplied to both of said reservoirs and for establishing another communication through which fluid under pressure is adapted to be released from the brake cylinder, a valve device subject to the opposing pressures of said reservoirs for controlling the release of fluid under pressure from the brake cylinder, said triple valve device being operative upon a reduction in brake pipe pressure for closing both of said communications and for establishing a communication through which fluid under pressure is supplied from the auxiliary reservoir to said brake cylinder, a reduction chamber and means operated upon an over reduction in brake pipe pressure for venting fluid under pressure from said control reservoir to said chamber.

20. In a fluid pressure brake, the combination with a brake pipe and a brake cylinder, of a normally charged reservoir, valve means subject to the pressure of fluid from said reservoir for retaining a predetermined pressure in the brake cylinder when the brakes are released in cycling, a reduction chamber, and means operated upon an over reduction in brake pipe pressure for venting fluid under pressure from said reservoir to said chamber to render said valve means ineffective to retain said predetermined pressure in the brake cylinder.

In testimony whereof I have hereunto set my hand, this 26th day of December, 1929.

CLYDE C. FARMER.